(12) United States Patent
Thiel

(10) Patent No.: US 9,436,947 B2
(45) Date of Patent: Sep. 6, 2016

(54) SYSTEMS AND METHODS FOR CONDUCTING SURVEYS

(71) Applicant: Cox Media Group Digital Development, Inc., Atlanta, GA (US)

(72) Inventor: William Robert Thiel, Duluth, GA (US)

(73) Assignee: COX MEDIA GROUP DIGITAL DEVELOPMENT, INC., Atlanta, GA (US)

( * ) Notice: Subject to any disclaimer, the term of this patent is extended or adjusted under 35 U.S.C. 154(b) by 30 days.

(21) Appl. No.: 13/675,006

(22) Filed: Nov. 13, 2012

(65) Prior Publication Data

US 2014/0134589 A1    May 15, 2014

(51) Int. Cl.
   *G06Q 30/02*      (2012.01)
(52) U.S. Cl.
   CPC .................. *G06Q 30/0201* (2013.01)
(58) Field of Classification Search
   CPC .. G06Q 30/02; G06Q 30/0203; G06Q 30/00; G06Q 30/0201
   USPC .................................. 434/322–350
   See application file for complete search history.

(56) References Cited

U.S. PATENT DOCUMENTS

| | | | | |
|---|---|---|---|---|
| 6,064,980 A | * | 5/2000 | Jacobi et al. | ................ 705/26.7 |
| 8,666,844 B2 | * | 3/2014 | Shaya et al. | ................ 705/26.7 |
| 8,904,441 B2 | * | 12/2014 | Westberg | ........... H04N 5/44543 386/296 |
| 2006/0136283 A1 | * | 6/2006 | Sabharwal | ............ G06Q 30/02 705/7.32 |
| 2006/0136305 A1 | * | 6/2006 | Fitzsimmons | ......... G06Q 30/02 705/26.1 |
| 2006/0249576 A1 | * | 11/2006 | Nakada et al. | ............... 235/382 |
| 2008/0131860 A1 | * | 6/2008 | Redd et al. | ................... 434/350 |
| 2014/0236989 A1 | * | 8/2014 | Pronk et al. | .................. 707/769 |

\* cited by examiner

*Primary Examiner* — Timothy A Musselman
(74) *Attorney, Agent, or Firm* — Sutherland Asbill & Brennan LLP

(57) ABSTRACT

Systems and methods for conducting one or more surveys are provided herein. In certain embodiments, one or more participants may be identified to take part in a survey. Each of the participants may be associated with a respective user computing device. The user computing devices may present each of the participants with content to rate and/or review. In this manner, each of the participants may provide a review and/or rating of the content via the user computing devices. Further, based at least in part on the review and/or rating of the content, a survey profile of the content may be determined.

21 Claims, 3 Drawing Sheets

SYSTEMS AND METHODS FOR CONDUCTING SURVEYS

BACKGROUND

Radio stations periodically conduct surveys to evaluate their formats and determine the appeal of certain songs and/or other content. One method by which radio stations survey listeners is to conduct surveys of focus groups. Typically, the surveys comprise gathering a number of listeners to a central location. A song (or excerpt thereof) is then played over loud speakers to the participants as a group who are then asked to record their opinion of the song.

BRIEF DESCRIPTION OF THE DRAWINGS

The detailed description is set forth with reference to the accompanying drawings, which are not necessarily drawn to scale. In the figures, the left-most digit(s) of a reference number identifies the figure in which the reference number first appears. The same reference numbers in different figures indicate similar or identical items.

DETAILED DESCRIPTION

Overview

Figure 1:
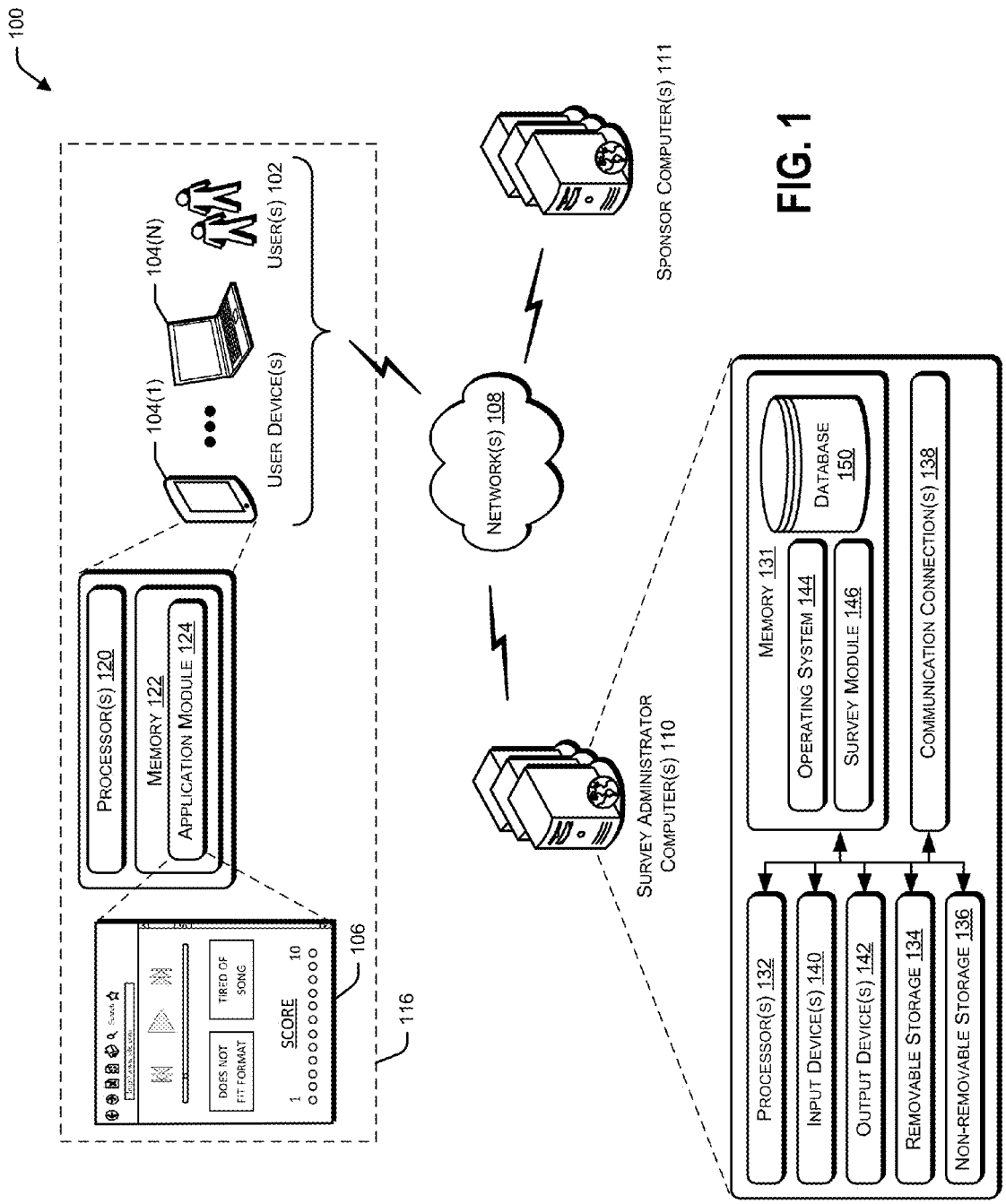
FIG. 1 is a block diagram of an illustrative system for conducting surveys, according to an illustrative embodiment.

Illustrative embodiments of the disclosure will now be described more fully hereinafter with reference to the accompanying drawings, in which some, but not all embodiments of the disclosure are shown. The systems and methods described herein may be embodied in many different forms and should not be construed as limited to the embodiments set forth herein; rather, these embodiments are provided so that this disclosure will satisfy applicable legal requirements. As noted above, like numbers refer to like elements throughout.

Illustrative embodiments of the disclosure are directed to, among other things, systems and methods for conducting surveys. As an overview, radio stations periodically assess the music that they are playing to determine whether they need to modify their playlist, format, advertising, or the like. Typically, the radio station (or a research company on behalf of the radio station) invites a number of participants (e.g., listeners of the radio station) to a central facility. The participants are asked to listen to a number of songs (or experts of songs) and score them on a scale. For example, songs are played over loud speakers to the participants as a group. The participants are then asked to score the songs. The scoring is generally done with bubble sheets, such as those commercially available from SCANTRON®. In this manner, the entire group of participants performs the survey at the same pace, which can create problems. For instance, some audience members may improperly mark their bubble sheets, lose focus, fall behind, get bored, etc. Also, the participants cannot individually hear the song more than once and/or take breaks. Further, every participant must survey the same song list and/or participate in the same test.

Some or all of the above needs and/or problems may be addressed by certain embodiments of the systems and methods described herein for conducting surveys. For example, in certain embodiments, a number of participants may be gathered to a central location. This enables the administrator of the survey to maintain control over the survey and ensure that the participants are engaged and taking the survey seriously. Each of the participants may be associated with a user device, such as a tablet or the like. In some instances, the user devices may be in communication with a survey administrator computer over a public or private network, such as the Internet. Each user device may be preloaded with a number of songs (or excerpts of songs), and/or the songs may be streamed to the user devices over the network. The user devices may include, for example, headsets or the like so that each participant can listen to the songs individually. In this manner, the participants are able to process (e.g., rate and/or review) the songs at their own pace. For example, the participants can replay songs or cut songs short, which the participants may want to do if they know certain songs or quickly form an opinion of certain songs.

In certain embodiments, the user devices may include a display with one or more graphical user interface elements. For example, in some instances, the display may include a play control and a timeline view. In this manner, the participants can play, stop, pause, rewind, fast-forward, and/or replay the songs. The display may also include one or more graphical user interface elements that are directed to rating and/or reviewing the songs. For example, the graphical user interface elements may include a number of scoring elements. The scoring elements may be in the form of a slider, radio buttons, or the like. In this manner, the participants may rate and/or review the songs via the scoring elements. Moreover, the scoring elements may include a comment section where the participants can provide commentary regarding their opinions of the songs. The display may also include one or more graphical user interface elements that indicate that the listener is tired of a song, that the song does not fit the station's format, that the song does not fit with the songs previously presented, or the like. Any number and/or type of graphical user interface elements may be used herein to enable the participants to control the user devices or provide a rating and/or review of the songs.

In certain embodiments, the ratings and/or reviews may be provided to the survey administrator computer for processing. That is, the survey administrator computer may determine, based at least in part on the ratings and/or reviews, one or more survey profiles for the various songs and/or groups of songs. In some instances, the survey may be conducted in real-time or near real-time. That is, the user devices may provide the ratings and/or reviews to the survey administrator computer in real-time, and the survey administrator computer may dynamically update the survey profiles of the songs in real-time.

In certain embodiments, the subsequent songs presented to the participants may be updated and revised based at least in part on the ratings and/or reviews provided by the participants, both individually and collectively. For example, if a participant or group of participants is giving jazz songs low ratings and country songs high ratings, the survey administrator computer may revise the type of songs being presented to the participate or group of participants, e.g., the participant or group of participants may no longer be presented with jazz songs as it is clear they do not enjoy them. The subsequent songs presented to the participants may be revised and/or updated for any reason. Moreover, the order of the songs may be presented to the participants differently to see if the order impacts the ratings. There may also be testing of multiple different formats at once. That is, there can be some participants testing a classic rock station, while others are testing a light jazz station, and yet others testing an urban contemporary station.

While the systems and methods have been described in terms of radio stations and songs, the systems and methods can equally be used to survey and/or test a variety of content, such as video, personality screen tests, billboards, advertisements, logos, messaging, talking points, multimedia content, website effectiveness, etc. Further, because the systems and methods described herein enable participants to test independently of one another, the participants in the same location can test different content at the same time. Further still, by way of example and without limitation, real-time communications between the participants and/or the survey administrators may include real-time, or near real-time, exchanges of communications or data. That is, communications and/or data may be updated continuously over a period of time or any appropriate interval based on the context. For example, as those of skill in the art will understand, different contexts may create different understandings of real-time.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 illustrates an example system 100 for conducting a survey, according to an example embodiment. As depicted in FIG. 1, the system 100 may include, among other things, a survey administrator computer 110, one or more user devices 104, and one or more sponsor computers 111. In addition, one or more users 102 (e.g., survey participants) may utilize the computing devices 104 to access one or more user application interfaces 106 (e.g., websites) that may be provided by, created by, or otherwise associated with a survey administrator via one or more networks 108. In some instances, the computing devices 104 may be configured to present or otherwise display the user application interface 106 to the one or more users 102. Additionally, each of the aforementioned devices may be in communication with each other as well as with the survey administrator computer 110 over a public and/or private network 108, such as the Internet or the like.

While the illustrated example represents users 102 accessing the user application interface 106 over the networks 108, the described techniques may equally apply in instances where the users 102 interact with a survey administrator via a personal computer, over the phone, via a kiosk, or in any other manner. It is also noted that the described techniques may apply in other client/server arrangements (e.g., set-top boxes, etc.), as well as in non-client/server arrangements (e.g., locally stored software applications, etc.).

The user devices 104 may be any type of computing devices including, but not limited to, desktop personal computers (PCs), laptop PCs, mobile phones, smart phones, personal digital assistants (PDAs), tablets PCs, game consoles, set-top boxes, wearable computers, e-readers, web-enabled TVs, cloud-enabled devices and work stations, or the like. In some instances, each user device 104 may be equipped with one or more processors 120 and memory 122 to store applications and data, such as user application module 124, that may display the user application interface 106 and/or enable access to a website stored on the survey administrator computers 110 or elsewhere. In some instances, the user application module 124 can be dedicated to an application running on the user device 104 with a web browser.

The survey administrator computers 110 may be any type of computing devices such as, but not limited to, mobile, desktop, and/or cloud computing devices, such as servers. In some examples, the survey administrator computers 110 may be in communication with the user devices 104 via the networks 108 or via other network connections. The survey administrator computers 110 may include one or more servers, perhaps arranged in a cluster, as a server farm, or as individual servers not associated with one another. These servers may be configured to host a website viewable via the user application 124 or any other web browser accessible by a user 102 such as, but not limited to, one or more of the user devices 104.

In some aspects, the user application interface 106 may allow the users 102 to access, receive from, transmit to, or otherwise interact with the survey administrator via the one or more survey administrator computers 110. For example, in some examples, the user application interface 106 may allow the users 102 to interact with the survey administrator via the one or more survey administrator computers 110 to participate in a survey. In this manner, the users 102 may provide their opinions (such as ratings and/or reviews) of content via the user devices 104. In certain embodiments, the users 102 may be gathered, confined, restricted, or the like to a central location 116. That is, when a user 102, potentially operating one or more user devices 104, desires to participate in a survey, the user 102 must be within a predefined boundary, such as, but not limited to, one or more rooms at a survey facility. This enables the survey administrator to maintain control over the survey and ensure that the users 102 are properly engaged in the survey.

In one illustrative configuration, the survey administrator computer 110 comprises at least a memory 131 and one or more processing units (or processor(s)) 132. The processor(s) 132 may be implemented as appropriate in hardware, software, firmware, or combinations thereof. Software or firmware implementations of the processor(s) 132 may include computer-executable or machine-executable instructions written in any suitable programming language to perform the various functions described.

Memory 131 may store program instructions that are loadable and executable on the processor(s) 132, as well as data generated during the execution of these programs. Depending on the configuration and type of survey administrator computer 110, memory 131 may be volatile (such as random access memory (RAM)) and/or non-volatile (such as read-only memory (ROM), flash memory, etc.). The survey administrator computer 110 or server may also include additional removable storage 134 and/or non-removable storage 136 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 131 may include multiple different types of memory, such as static random access memory (SRAM), dynamic random access memory (DRAM), or ROM.

The memory 131, the removable storage 134, and the non-removable storage 136 are all examples of computer-readable storage media. For example, computer-readable storage media may include volatile and non-volatile, removable and non-removable media implemented in any method or technology for storage of information such as computer-readable instructions, data structures, program modules, or other data. Memory 131, removable storage 134, and non-removable storage 136 are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the survey administrator computer 110 or other computing devices. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The survey administrator computer 110 may also contain communication connection(s) 138 that allow the survey administrator computer 110 to communicate with a stored database, another computing device or server, user terminals, and/or other devices on a network. The survey administrator computer 110 may also include input device(s) 140 such as a keyboard, mouse, pen, voice input device, touch input device, etc., and output device(s) 142, such as a display, speakers, printers, etc.

Turning to the contents of the memory 131 in more detail, the memory 131 may include an operating system 144 and one or more application programs or services for implementing the features disclosed herein including a survey module 146 and an information database 150. In some instances, the various modules, such as the survey module 146, may receive, transmit, and/or store information in the information database 150 and/or the application module 124. The survey module 146 may be configured to present content to each of the participants via the user computing devices 104. For example, the content may be presented or otherwise displayed by the user application interface 106 to the users 102. The content may include advertisements, logos, songs, excerpts of songs, videos, or the like. In some instances, the survey module 146 may be configured to present the users 102 with an initial survey or questionnaire to determine the appropriate content to present to each of the participants via the user computing devices 104.

In some instances, the survey module 146 may be configured to present different content contemporaneously to each of the user computing devices 104. For example, one user 102 may be presented with content associated with a radio station that plays classical music, while another user 102 may be presented with content associated with a radio station that plays hip-hop music. In another example, one user 102 may be presented with content associated with an advertisement for a car, while another user 102 may be presented with an advertisement for a restaurant. Further, the survey module 146 may be configured to receive a review and/or rating of the content from each of the participants via the user computing devices 104. In some instances, based at least in part on the review and/or rating of the content by the users 102, the survey module 146 may also be configured to determine a survey profile of the content. For example, the survey module 146 may identify if content receives an overall favorable or negative rating and/or review. In some instances, the survey module 146 may receive the ratings and/or reviews in real-time or near real-time from the user computing devices 104. In this manner, the survey module 146 may be configured to generate and/or update the survey profiles in real-time or near real-time.

In certain embodiments, the survey module 146 may be configured to update and revise, based at least in part on the ratings and/or reviews provided by the participants, the subsequent content presented to the users 102. That is, the users 102 may be presented with initial content and thereafter with subsequent content that is based on the responses received from the user 102 regarding the initial content. For example, if a user 102 is giving up-tempo songs low ratings and slow tempo songs high ratings, the survey module 146 may revise the type of songs being presented to the user 102. In this manner, the user 102 may be presented with content that is more likely to promote a reliable survey result. Other user prompts or responses may also be used to determine the subsequent content presented to the users 102. For example, one or more user biometrics may be monitored and evaluated. Moreover, the parameters associated with the content may be revised. For example, the length of a video clip or song excerpt may be adjusted, or the time between content may be adjusted. Further, questions may be presented to the user 102 before, during, or after reviewing the content.

In certain embodiments, a test sponsor, such as a radio station, may receive real-time results, such as real-time survey profiles of songs, during the testing via the sponsor computers 111. Moreover, because the user responses are evaluated in real-time, faulty data (e.g., data from participants who are scoring everything the same or who demonstrate that they are not providing genuine feedback based on their scoring of the control content specimen) may be removed. Further, because several different tests may be conducted at once for different sponsors, any given study may last more than one session, and thus sponsors may be able to evaluate the dynamic results of the test in real-time to get a feel for what the data is telling them.

Figure 2:
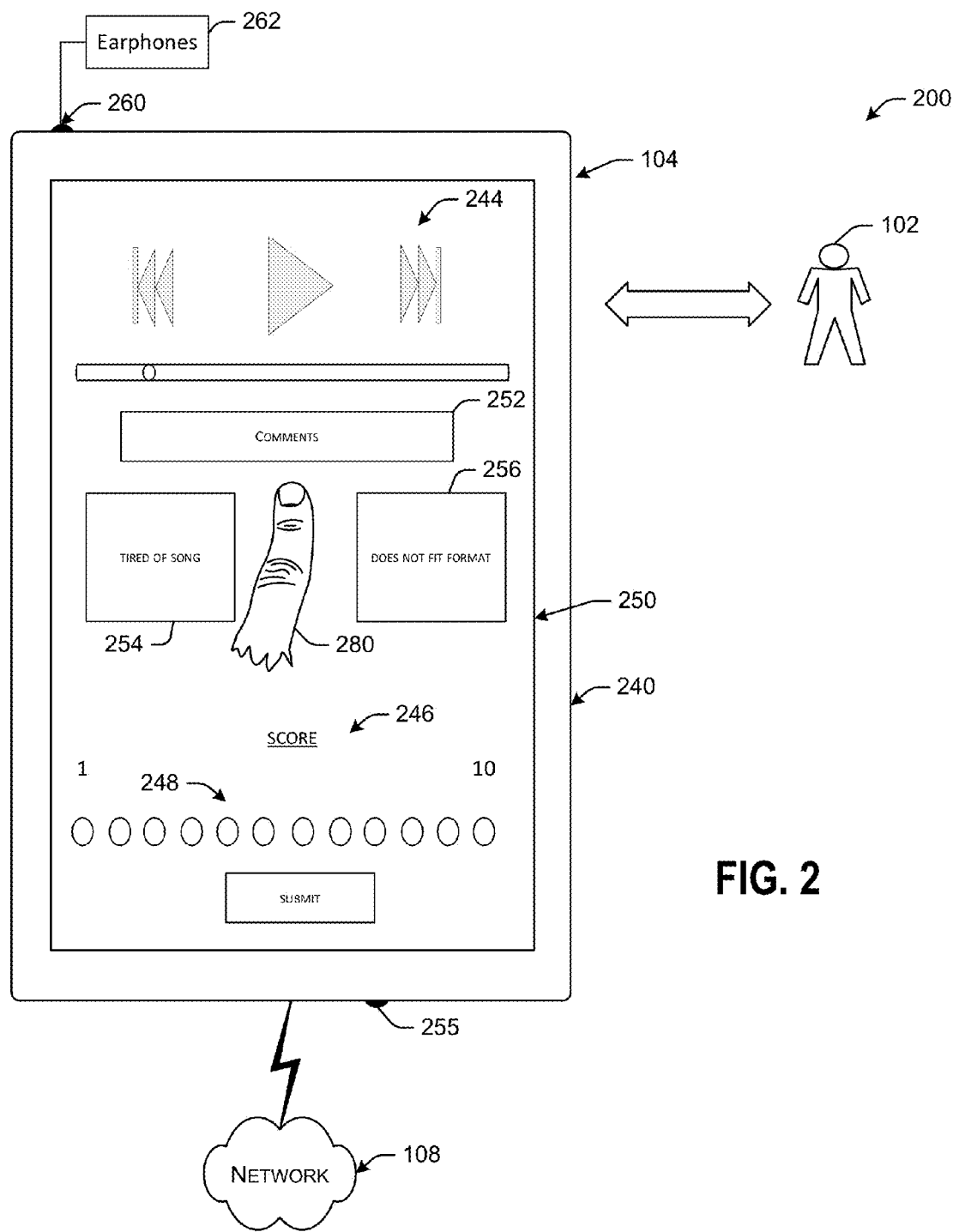
FIG. 2 is an illustrative user computing device and application interface for conducting surveys, according to an illustrative embodiment.

FIG. 2 depicts a schematic illustration of an example user computing devices 104 with a touch sensitive display that may be configured to enable the user 102 to participate in the survey. The illustrative environment 200 depicts techniques for selecting elements on the user computing device 104. The user computing device 104 may be configured to interact with the user 102. The user computing device 104 may further be configured to interact with other elements or other devices via one or more communicative links, such as a connection to the network 108. In certain aspects, the user computing device 104 may be configured to download and/or upload content files and/or other content data via the network 108. In this manner, the user computing device 104 may present previously uploaded content to the user 102 and/or streaming content to the user 102.

The user computing device 104 may include a chassis and/or casing 240. The user computing device 104 may further include one or more user input interfaces, such as a touch sensitive display screen 250. Further still, the user computing device 104 may include one or more switches and/or buttons 255 to enable user control of one or more functionalities of the user computing device 104 and/or to provide survey input. The user computing device 104 may further include one or more input/output interfaces 260, such as microphones, speakers (or earphones 262), image sensors, accelerometers, gyroscopes, or the like. While the drawings and/or specification may portray the user computing device 104 in the likeness of an e-book reader and/or tablet computing device, the disclosure is not limited to these devices. Indeed, the systems and methods described herein may apply to any electronic device capable of displaying content, such as text, images, and/or sound.

The user 102 may interact with the touch sensitive display screen 250 by way of a pointing device, such as a finger 280 of the user 102. In certain embodiments, the user 102 may interact with one or more graphical user interface elements. For example, in some instances, the touch sensitive display screen 250 may include a play and timeline element 244, allowing the user 102 to play, stop, pause, rewind, fast-forward, and/or replay the content, such as a song or video. The touch sensitive display screen 250 may also include graphical user interface elements that are directed to rating and/or reviewing the content. For example, the graphical user interface elements may include a number of scoring elements 246. The scoring elements 246 may be in the form of radio buttons 248, although other configurations are possible. In this manner, the users 102 may rate and/or review the content via the scoring elements 246 by selecting one of the radio buttons 248. Moreover, the touch sensitive display screen 250 may include a comment section 252 where the user 102 can input text regarding their opinions of the content. In certain embodiments, the survey module 146 may be configured to mine the comments entered by the users 102 to determine a rating or the like.

The touch sensitive display screen 250 may also include graphical user interface elements that indicate that the user 102 is tired of the content 254, or that the content does not fit the format 256 or is unrelated to the previous content. Any number and/or type of graphical user interface elements may be used herein. For example, in the context of TV, personality, ad, etc. testing, touch sensitive display screen 250 may also include graphical user interface elements that indicate a "does not like" function or a "confusing" function.

Various instructions, methods, and techniques described herein may be considered in the general context of computer-executable instructions, such as program modules, executed by one or more computers or other devices. Generally, program modules include routines, programs, objects, components, data structures, etc., for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example system 100 and survey administrator computer 110 shown in FIG. 1 are provided by way of example only. Similarly, the example system 200 and user computing device 104 shown in FIG. 2 are provided by way of example only. Numerous other operating environments, system architectures, and device configurations are possible. Accordingly, embodiments of the present disclosure should not be construed as being limited to any particular operating environment, system architecture, or device configuration.

Illustrative Processes

Figure 3:
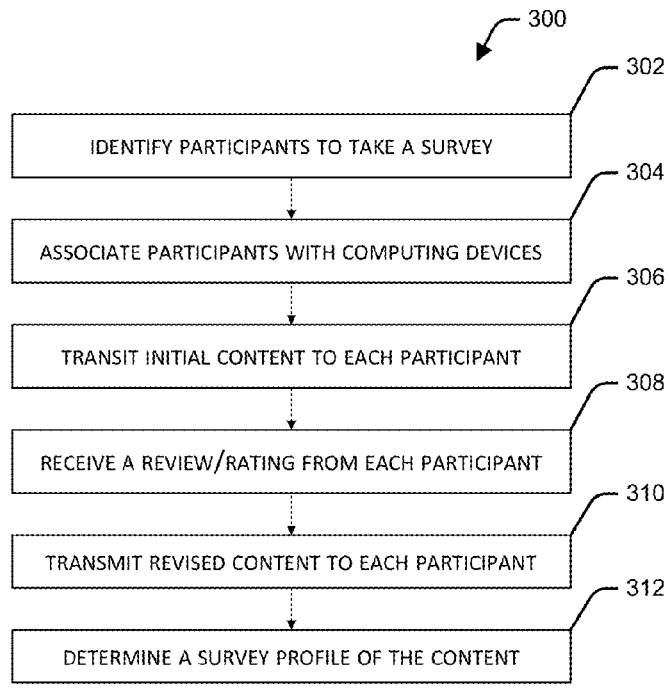
FIG. 3 is a flow diagram illustrating details of a method of conducting surveys, according to an illustrative embodiment.

FIG. 3 is a flow diagram of an illustrative process 300 for conducting a survey, as described with reference to FIGS. 1 and 2. The illustrative process 300 may be utilized to by a survey administrator to conduct one or more surveys and/or tests on a variety of content, such as songs, video, personality screen tests, billboards, advertisements, logos, messaging, talking points, multimedia content, etc. The illustrative process 300 may be utilized to survey groups of individuals collectively. That is, the survey participants in the same location can test the same or different content at the same time. In certain embodiments, the survey administrator computer 110 and/or the user computing device 104 may perform any, some, or all of the operations of process 300.

This process 300 is illustrated as a logical flow graph, in which some of the operations represent a sequence of operations that can, but are not required to, be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In this particular implementation, the process 300 may begin at block 302 in which the process 300 may identify one or more participants to take a survey. In one example, the participants may be radio station listeners. One will appreciate, however, that the participants may be any demographic. That is, depending on the content being surveyed, the participants may vary. In this manner, any known techniques for identifying possible participants may be used herein. At block 304, the process 300 may provide the participants with computing devices, such as user computing devices 104. In some instances, each of the participants may be provided with a user computing device 104. In other instances, each of the participants may participate in the survey by downloading an application onto their own user computing device 104 or accessing a website. In any case, each of the participants may be associated with a user computing device 104, such as a tablet or the like. In some instances, the user computing devices 104 may be in communication with a survey administrator computer 110 over a network 108. Each user computing device 104 may be preloaded with content, such as a number of songs, images, or videos (or excerpts thereof), and/or the content may be streamed to the user computing devices 104 over the network 108. The user computing devices 104 may include, for example, a touch sensitive display screen 250 and/or earphones 262 or the like so that each participant can view and/or listen to the content individually.

At block 306, the process 300 may present initial content to each of the participants. That is, each of the participants may be presented with initial content (such as one or more songs) via the user computing devices 104. In some instances, the initial content may be presented on the touch sensitive display screen 250 or via the earphones 262 of the user computing devices 104. The process 300, at block 308, may receive ratings and/or reviews from each of the participants. For example, each of the participants may asses the initial content via the user computing devices 104 and provide a rating and/or review of the initial content. In certain embodiments, participants may rate and/or review the content via the scoring elements 246 of the display, for example, by selecting one of the radio buttons 248. In some instances, the participants may also provide a comment in the comment section 252. The touch sensitive display screen 250 may also include graphical user interface elements that indicate that the user 102 is tired of the content 254 or that the content does not fit the format 256 or is unrelated to the initial content.

The process 300, at block 310, may present new content to each participant. That is, in certain embodiments, the participants may be presented with initial content and thereafter with subsequent content that has been revised or updated based at least in part on the input to the prior content. For example, the new content may include an updated playlist, a new format to review, a new advertisement, etc. The revised content may be based at least in part on the responses received from the participants regarding the initial content. For example, if the initial content present to a user 102 is associated with advertisements for Italian restaurants, and the ratings and/or reviews of the initial content indicate that the user 102 does not like Italian food, then the user 102 may be presented with revised content that is not related to Italian food, such as advertisements for Mexican restaurants. In this manner, the user 102 may be presented with content that is more likely to promote a reliable survey result.

At block 312, the process 300 may determine a survey profile of the content. For example, in certain embodiments, the ratings and/or reviews may be provided (e.g., transmitted over the network 108) to the survey administrator computer 110 for processing. The survey administrator computer 110 may determine, based at least in part on the ratings and/or reviews received from the users 102 for the initial and/or revised content, one or more survey profiles for the content. In some instances, the user computing devices 104 may provide the ratings and/or reviews to the survey administrator computer 110 in real-time or near real-time, and the survey administrator computer 110 may dynamically update the survey profiles of the content in real-time or near real-time.

Figure 4:
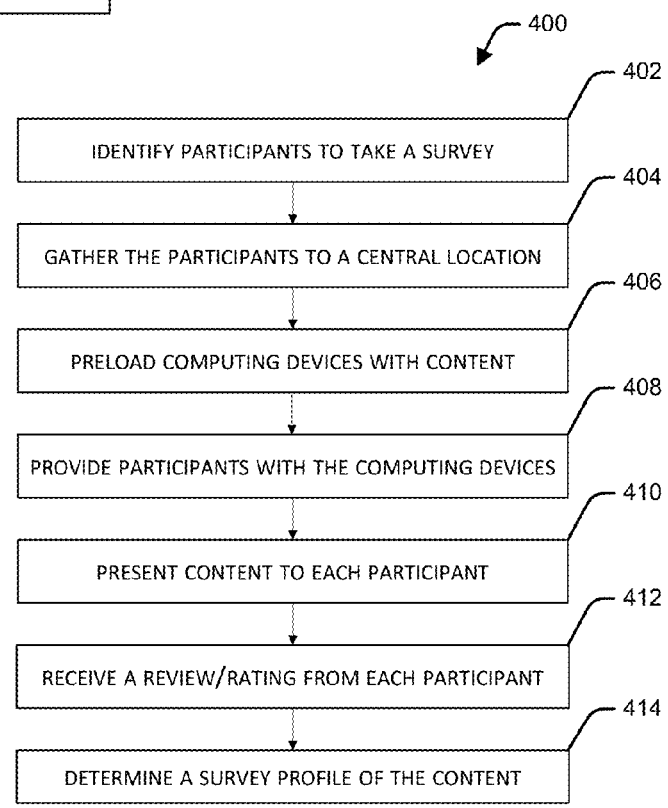
FIG. 4 is a flow diagram illustrating details of a method of conducting surveys, according to an illustrative embodiment.

FIG. 4 is a flow diagram of an illustrative process 400 for conducting surveys, as described with reference to FIGS. 1 and 2. The illustrative process 400 may be utilized to by a survey administrator to conduct one or more surveys and/or tests on a variety of content, such as songs, video, personality screen tests, billboards, advertisements, logos, messaging, talking points, multimedia content, etc. The illustrative process 400 may be utilized to survey groups of individuals collectively. That is, the survey participants in the same location can test the same or different content at the same time. In certain embodiments, the survey administrator computer 110 and/or the user computing devices 104 may perform any, some, or all of the operations of process 400.

This process 400 is illustrated as a logical flow graph, in which some of the operations represent a sequence of operations that can, but are not required to, be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In this particular implementation, the process 400 may begin at block 402 in which the process 400 may identify one or more participants to take a survey. As noted above, depending on the content being surveyed, the participants may vary. In this manner, any known techniques for identifying possible participants may be used herein. At block 404, the process 400 may gather the participants to a central location 116. For example, in certain embodiments, the users 102 may be gathered, confined, restricted, or the like to a central location 116, such as, but not limited to, one or more rooms at a survey facility. This enables the survey administrator to maintain control over the survey and ensure that the users 102 are properly engaged in the survey. At block 406, each user computing device 104 may be preloaded with content, such as a number of songs (or excerpts of songs). In other embodiments, however, the content may be streamed to the user computing devices 104 over the network 108.

At block 408, the process 400 may provide the participants with computing devices, such as user computing devices 104. In other instances, each of the participants may participate in the survey by downloading an application onto their own user computing device 104. In any case, each of the participants may be associated with a user computing device 104, such as a tablet or the like. In some instances, the user computing devices 104 may be in communication with a survey administrator computer 110 over a network 108. The user computing devices 104 may include, for example, a touch sensitive display screen 250 and/or earphones 262 or the like so that each participant can view and/or listen to the content individually.

The process 400 may receive present content to each of the participants at block 410. That is, each of the participants may be presented with content (such as one or more images, songs, video, advertisements, excerpts, etc.) via the user computing devices 104. In some instances, the content may be presented on the touch sensitive display screen 250 or via the earphones 262 of the user computing devices 104. The process 400, at block 412, may receive ratings and/or reviews from each of the participants. For example, each of the participants may asses the content via the user computing devices 104 and provide a rating and/or review of the content. In certain embodiments, participants may rate and/or or review the content via the scoring elements 246 of the display by selecting one of the radio buttons 248. In some instances, the participants may also provide a comment in the comment section 252. The touch sensitive display screen 250 may also include graphical user interface elements that indicate that the user 102 is tired of the content 254, or that the content does not fit the format 256 or is unrelated to the initial content.

At block 414, the process 400 may determine a survey profile of the content. For example, in certain embodiments, the ratings and/or reviews may be provided (e.g., transmitted over the network 108) to the survey administrator computer 110 for processing. The survey administrator computer 110 may determine, based at least in part on the ratings and/or reviews received from the users 102, one or more survey profiles for the content. In some instances, the user computing devices 104 may provide the ratings and/or reviews to the survey administrator computer 110 in real-time or near real-time, and the survey administrator computer 110 may dynamically update the survey profiles of the content in real-time or near real-time.

Illustrative systems and methods of for conducting surveys are described above. Some or all of these systems and methods may, but need not, be implemented at least partially by an architecture such as that shown in FIGS. 1 and 2. It should be understood that certain acts in the methods need not be performed in the order described, may be rearranged or modified, and/or may be omitted entirely, depending on the circumstances. Also, any of the acts described above with respect to any method may be implemented by a processor or other computing device based on instructions stored on one or more computer-readable storage media.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A method of conducting a survey, comprising:
   identifying a central area having a predefined boundary for surveying one or more participants, each being associated with a respective user device;
   determining that a first user device associated with a first participant is within the identified central area and in response providing, over a wireless mobile network, at least a portion of survey content and first data defining a first order of presentation of the survey content to the first user device;
   determining that a second user device associated with a second participant is within the identified central area and in response providing, over the wireless mobile network, at least a portion of the survey content and second data defining a second order of presentation of the survey content to the second user device;
   receiving, by the at least one processor, a review or rating of the survey content from at least the first and the second user devices;
   based at least in part on receiving the review or rating from the first and second user devices, determining, by the at least one processor and based at least in part on the reviews or ratings of the survey content received from the first and second user devices, that the order of the content presented at the first and second user devices impacted the review or ratings of the survey content;
   revising, by the at least one processor and based at least in part on the review or rating of the survey content presented at the first user device exceeding the review or rating of the survey content presented at second user device, the order in which subsequent survey content to be reviewed or rated is sent to other user devices associated with other participants from the one or more participants, wherein revising the order comprises for at least one of the subsequent survey content sent to one of the other user devices changing the order from the second order to the first order;
   revising, by the at least one processor and based at least in part on the review or rating of the survey content received from the first and the second user devices, one or more parameters associated with subsequent content to be reviewed or rated that is sent to at least one of the one or more participants, wherein the one or more parameters comprises a length of the content presented to at least one of the one or more participants;
   determining, by the at least one processor and based at least in part on the review or rating of the survey content by at least one of the one or more participants, a survey profile of the content; and
   in response to revising the order, providing over the wireless mobile network, instructions to a content providing management system to present content from the survey content at the first order to a plurality of user devices.

2. The method of claim 1, further comprising:
   determining that a fourth user device associated with a fourth participant is within the identified central area and in response providing, over a mobile network, particular survey content different from the survey content to the fourth user device.

3. The method of claim 1, further comprising dynamically updating, by the at least one processor, the survey profile of the content as the reviews or ratings of the content are received.

4. The method of claim 3, further comprises transmitting, by the at least one processor, the dynamically updated survey profile of the content to a test sponsor in real-time.

5. The method of claim 1, wherein the content is streamed to the user computing devices.

6. The method of claim 1, wherein the content comprises one or more images, videos, recordings, or excerpts thereof.

7. The method of claim 1, wherein the content comprises one or more songs, videos, personality screen tests, billboards, advertisements, logos, messaging, talking points, multimedia content, or excerpts thereof.

8. The method of claim 1, wherein the user computing devices comprise a number of graphical user interface elements.

9. The method of claim 8, wherein the graphical user interface elements are configured to enable at least one of the one or more participants to rate or review the content.

10. The method of claim 8, wherein the graphical user interface elements are configured to enable at least one of the one or more participants to at least partially control the content.

11. The method of claim 1, further comprising:
    monitoring, by the at least one processor, one or more biometrics of at least one of the one or more participants; and
    revising, by the at least one processor and based at least in part on the one or more biometrics of at least one of the one or more participants, subsequent content to be reviewed or rated that is presented to at least one of the one or more participants; or
    revising, by the at least one processor and based at least in part on the one or more biometrics of at least one of the one or more participants, one or more parameters associated with the content to be reviewed or rated that is presented to at least one of the one or more participants.

12. The method of claim 1 further comprising:
    determining that a third user device associated with a third participant is outside the identified central area and in response not providing the survey content to the third user device.

13. A system for conducting a survey at a central location, comprising:
    at least one memory that stores computer-executable instructions;
    at least one processor configured to access the at least one memory, wherein the at least one processor is configured to execute the computer-executable instructions to perform operations comprising:

identifying a central area having a predefined boundary for surveying one or more participants, each being associated with a respective user device;

determining that a first user device associated with a first participant is within the identified central area and in response providing, over a wireless mobile network, at least a portion of survey content and first data defining a first order of presentation of the survey content to the first user device;

determining that a second user device associated with a second participant is within the identified central area and in response providing, over the wireless mobile network, at least a portion of the survey content and second data defining a second order of presentation of the survey content to the second user device;

receiving, by the at least one processor, a review or rating of the survey content from at least the first and the second user devices;

based at least in part on receiving the review or rating from the first and second user devices, determining, by the at least one processor and based at least in part on the reviews or ratings of the survey content received from the first and second user devices, that the order of the content presented at the first and second user devices impacted the review or ratings of the survey content;

revising, by the at least one processor and based at least in part on the review or rating of the survey content presented at the first user device exceeding the review or rating of the survey content presented at second user device, the order in which subsequent survey content to be reviewed or rated is sent to other user devices associated with other participants from the one or more participants, wherein revising the order comprises for at least one of the subsequent survey content sent to one of the other user devices changing the order from the second order to the first order;

revising, by the at least one processor and based at least in part on the review or rating of the survey content received from the first and the second user devices, one or more parameters associated with subsequent content to be reviewed or rated that is sent to at least one of the one or more participants, wherein the one or more parameters comprises a length of the content presented to at least one of the one or more participants;

determining, by the at least one processor and based at least in part on the review or rating of the survey content by at least one of the one or more participants, a survey profile of the content; and in response to revising the order, providing over the wireless mobile network, instructions to a content providing management system to present content from the survey content at the first order to a plurality of user devices.

14. The system of claim 13, wherein the instructions further comprise:

determining that a fourth user device associated with a fourth participant is within the identified central area and in response providing, over a mobile network, particular survey content different from the survey content to the fourth user device.

15. The system of claim 13, wherein the user computing devices are preloaded with the content.

16. The system of claim 13, wherein the content is streamed to the user computing devices.

17. The system of claim 13, wherein the content comprises one or more images, videos, recordings, or excerpts thereof.

18. The system of claim 13, wherein the user computing devices comprise a number of graphical user interface elements.

19. The system of claim 18, wherein the graphical user interface elements are configured to enable at least one of the one or more participants to rate or review the content.

20. The system of claim 18, wherein the graphical user interface elements are configured to enable at least one of the one or more participants to at least partially control the content.

21. One or more computer-readable media storing computer-executable instructions that, when executed by at least one processor, configure the at least one processor to perform operations comprising:

identifying a central area having a predefined boundary for surveying one or more participants, each being associated with a respective user device;

determining that a first user device associated with a first participant is within the identified central area and in response providing, over a wireless mobile network, at least a portion of the survey content and first data defining a first order of presentation of the survey content to the first user device;

determining that a second user device associated with a second participant is within the identified central area and in response providing, over the wireless mobile network, at least a portion of the survey content and second data defining a second order of presentation of the survey content to the second user device;

receiving, by the at least one processor, a review or rating of the survey content from at least the first and the second user devices;

based at least in part on receiving the review or rating from the first and second user devices, determining, by the at least one processor and based at least in part on the reviews or ratings of the survey content received from the first and second user devices, that the order of the content presented at the first and second user devices impacted the review or ratings of the survey content;

revising, by the at least one processor and based at least in part on the review or rating of the survey content presented at the first user device exceeding the review or rating of the survey content presented at second user device, the order in which subsequent survey content to be reviewed or rated is sent to other user devices associated with other participants from the one or more participants, wherein revising the order comprises for at least one of the subsequent survey content sent to one of the other user devices changing the order from the second order to the first order;

revising, by the at least one processor and based at least in part on the review or rating of the survey content received from the first and the second user devices, one or more parameters associated with subsequent content to be reviewed or rated that is sent to at least one of the one or more participants, wherein the one or more parameters comprises a length of the content resented to at least one of the one or more participants;

determining, by the at least one processor and based at least in part on the review or rating of the survey content by at least one of the one or more participants, a survey profile of the content; and in response to revising the order, providing over the wireless mobile network, instructions to a content providing management system to present content from the survey content at the first order to a plurality of user devices.

* * * * *